United States Patent
Brooks et al.

[11] Patent Number: 6,149,012
[45] Date of Patent: Nov. 21, 2000

[54] SYSTEM AND METHOD FOR CLEANING AND RECOVERING PLASTIC FROM COATED FIBER POLYWASTE

[75] Inventors: J. Douglas Brooks; Ronnie R. Bennett, both of Springdale, Ark.

[73] Assignee: Advanced Environmental Recycling Technologies, Inc., Springdale, Ark.

[21] Appl. No.: 09/193,829

[22] Filed: Nov. 17, 1998

Related U.S. Application Data

[60] Provisional application No. 60/065,779, Nov. 17, 1997.

[51] Int. Cl.$^7$ ............................... B03B 1/00; B03D 3/00
[52] U.S. Cl. .................. 209/3; 209/4; 209/5; 209/7; 209/10; 209/11; 209/12.1; 209/930
[58] Field of Search ................... 209/3, 4, 5, 7, 209/10, 11, 12.1, 930

[56] References Cited

U.S. PATENT DOCUMENTS

| | | | |
|---|---|---|---|
| 2,471,043 | 5/1949 | Schenck | 241/14 |
| 3,897,011 | 7/1975 | Gray | 241/15 |
| 4,033,517 | 7/1977 | Weiss | 241/46.11 |
| 4,162,768 | 7/1979 | Froats | 241/45 |
| 4,199,109 | 4/1980 | Watanabe | 241/14 |
| 4,233,600 | 11/1980 | Rogers | 340/683 |
| 5,061,735 | 10/1991 | Zielinski | 521/46.5 |
| 5,084,184 | 1/1992 | Brooks et al. . | |
| 5,100,545 | 3/1992 | Brooks . | |
| 5,110,055 | 5/1992 | Teeny | 241/15 |
| 5,225,130 | 7/1993 | Deiringer | 264/102 |
| 5,268,074 | 12/1993 | Brooks et al. | 162/4 |
| 5,277,758 | 1/1994 | Brooks et al. | 162/4 |
| 5,335,786 | 8/1994 | Roberto | 209/3 |
| 5,350,562 | 9/1994 | Anthony | 422/1 |
| 5,351,895 | 10/1994 | Brooks et al. . | |
| 5,390,860 | 2/1995 | Ali et al. | 241/20 |
| 5,522,554 | 6/1996 | Blank et al. | 241/23 |
| 5,908,165 | 6/1999 | Guschall et al. | 241/23 |

FOREIGN PATENT DOCUMENTS

| | | | |
|---|---|---|---|
| 0002122 | 5/1979 | European Pat. Off. | 209/3 |

*Primary Examiner*—Donald P. Walsh
*Assistant Examiner*—David A Jones
*Attorney, Agent, or Firm*—Locke Liddell & Sapp LLP; Monty L. Ross

[57] ABSTRACT

A method for recovering densified plastic from mixed waste containing plastic and less than about 15 weight percent paper, and having a density ranging from about 2 to about 3 pounds per cubic foot, the method comprising the steps of shredding the mixed waste at ambient conditions; charging a batch of shredded waste weighing from about 250 to about 650 lbs. to a densifier; further shredding the mixed waste inside the densifier with a motor-driven rotating blade while monitoring surface temperature of the plastic inside the densifier, amperage drawn by the motor-driver and vibration level within the densifier; continuously shredding waste inside the densifier for a period ranging from about 5 to about 20 minutes, until the surface temperature of the plastic reaches at least about 220° F., until the amperage drawn by the motor increases, and until the vibration level inside the densifier increases; thereafter injecting a cooling fluid into the densifier to lower the surface temperature of the plastic to range of from about 120° to about 165° F. and agglomerate the plastic into particles ranging in size from about $\frac{1}{16}$ to about $\frac{1}{2}$ inch and having a paper content lower than about three percent by weight; and thereafter recovering densified plastic having a density ranging from about 16 to about 25 pounds per cubic foot.

10 Claims, 1 Drawing Sheet

SYSTEM AND METHOD FOR CLEANING AND RECOVERING PLASTIC FROM COATED FIBER POLYWASTE

CROSS REFERENCE TO RELATED APPLICATION

This application is a continuation-in-part of provisional application Ser. No. 60/065,779, filed Nov. 17, 1997, the entire contents of which is incorporated by reference herein.

BACKGROUND OF THE INVENTION

1. Field of the Invention

This application relates to apparatus and methods for recovering plastic from commingled plastic and fiber waste, and more particularly, to a dry process for removing paper and other contaminants from precleaned hydropulp polywaste comprising polyethylene. A preferred use for the recovered plastic is in the production of extruded composite building materials comprising plastic and wood fiber.

2. Description of Related Art

In the reclamation of plastic from various sources, the use of magnets, screens, shaker tables, and the like, is well known for removing tramp materials such as ferrous and non-ferrous metals, rocks, wood chunks, etc. The separation of lighter contaminants such as paper, undesirable comingled plastics, nylon tape strips, and the like, from reclaimed plastic has been more difficult. While cyclones are sometimes useful for separating lighter materials, they too are often inadequate when the contaminants are similar in size and weight to the plastic sought to be reclaimed.

One major source of reclaimable polyethylene suitable for use as a feedstock in manufacturing extruded composite building materials made of plastic and wood fiber is baled polywaste from hydropulping mills. Hydropulping mills recover paper fiber, often bleached paper fiber having a comparatively high value, from plastic-coated paper scrap such as that used to make milk cartons, plastic-coated paper plates, and other products. However, because reclaimed polyethylene contaminated with a substantial amount of paper fiber is generally unsatisfactory for use by manufacturers of plastic-coated paper products, the plastic-containing waste material from the hydropulping mills is dewatered, baled and sold as scrap. In the past, the amount of paper remaining in the precleaned polywaste from hydropulping mills often exceeded 20% by weight. As paper recycling technology has improved, the paper content of the hydropulping polywaste has fallen, frequently to levels of 15% or below.

The presence of minor amounts of paper fiber, such as about 5% or less, in reclaimed plastic used for manufacturing composite wood and plastic building materials is not detrimental to the resultant product, provided that the moisture content is maintained at a satisfactorily low level. In the past, particularly when the paper content of plastic waste obtained from hydropulpers, from post-consumer plastic bags and from other sources was higher, one method use for separating the plastic and paper was to place the combined waste in a water tank, sometimes in the presence of flocculants. Because paper fibers readily absorb water, they tend to sink in water separation tanks, whereas polyethylene plastic scrap will float and can be skimmed from the top. Nevertheless, the use of such "wet" processes has several disadvantages including, for example, the capital and operating costs associated with installing and operating water circulation pumps and filtration systems, pH and flocculant control, and compliance with wastewater treatment regulations. Moreover, the higher water content of any paper recovered from the water separation tank together with the plastic can cause problems during extrusion unless the water is first removed by thorough drying.

Prior art wet systems are used to prewash and clean highly contaminated plastic and paper mixtures containing up to 50% paper or fibrous waste. Assignee of the present invention also owns U.S. Pat. Nos. 5,084,184, 5,100,545 and 5,351,895, which disclose a method and related apparatus for use in recovering plastic from contaminated recycle scrap containing plastic, paper and other tramp materials through use of sink/float water separation techniques.

An efficient and economical process is therefore needed that can be used to separate paper and tramp contaminants from reclaimed plastic waste, particularly hydropulp polyethylene waste, without the need for water separation tanks or related equipment. An effective system and method for recovering plastic from baled hydropulp by a dry process are needed to avoid the drying time and expense that are otherwise required to remove moisture from the plastic and paper recovered through use of the wet process. One such particularly effective system and method are disclosed herein.

SUMMARY OF THE INVENTION

According to the present invention, a system and method are disclosed for recovering plastic, especially polyethylene, from coated fiber polywaste and for separating paper contaminants from post-consumer high density polyethylene bags without the use of water separation equipment. According to one preferred embodiment of the invention, a system and method are disclosed for recovering densified plastic containing less than about five weight percent paper, preferably less than about three weight percent paper, and most preferably less than about one weight percent paper. According to another preferred embodiment of the invention, a system and method are disclosed for reclaiming polyethylene from hydropulp waste and postconsumer bags in a form having a particle size ranging from about 1/16" to about 1/2", a density ranging from about 16 to about 25 pounds per cubic foot, and a paper content of less than about three to five weight percent, most preferably less than about one weight percent.

The system and method disclosed herein utilize shredding, screening, magnetic separation and cyclone separation equipment and techniques in combination with densification and agglomeration of the plastic/paper material under controlled conditions, followed by lint screening and aspiration or air-washing to produce the reclaimed product. Densification and agglomeration are preferably achieved with controlled injection of water, steam or carbon dioxide into a vessel containing a rotating blade with adjustable knives, wherein temperature, vibration and motor amperage are monitored and controlled to achieve the desired particle size and density.

BRIEF DESCRIPTION OF THE DRAWINGS

The system and method of the invention is further described and explained in relation to the following figures of the drawings wherein.

DESCRIPTION OF THE PREFERRED EMBODIMENTS

The system and method disclosed herein are preferably used for recovering densified plastic from industrial and postconsumer waste in a form that can be used in the manufacture of extruded composite building materials containing plastic and wood fiber. To be useful for the intended purpose, plastic materials comprising a major portion of polyethylene are particularly preferred. However, while recovery of polyethylene is a focal point of the system and method that are discussed in greater detail below, it will be apparent upon reading this disclosure that the methods and apparatus are similarly applicable to the recovery of other plastics as well.

Figure 1:
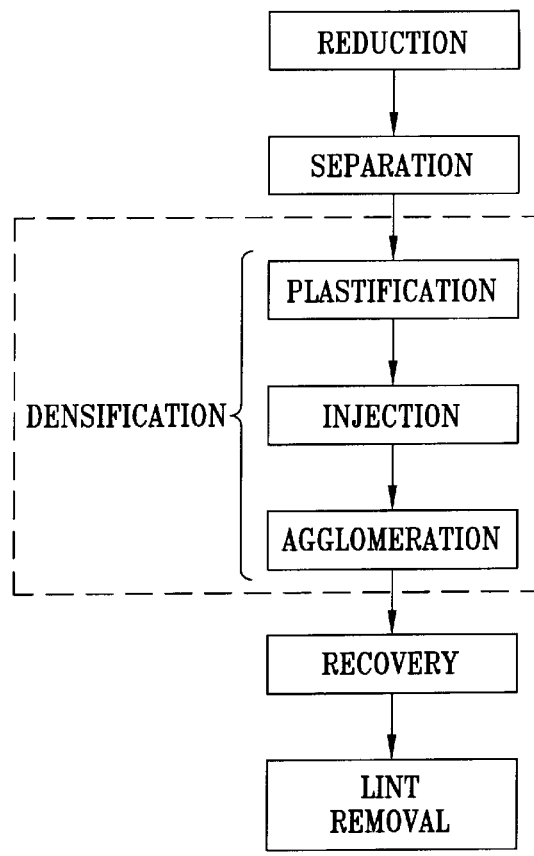
FIG. 1 is a simplified schematic depicting a preferred embodiment of the method of the invention.
Figure 2:
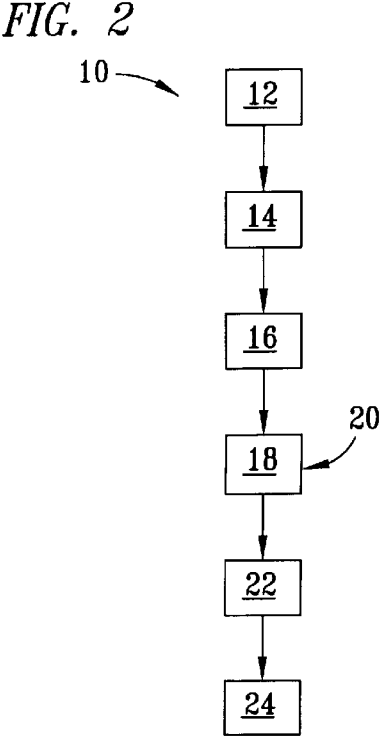
FIG. 2 is a simplified schematic depicting a preferred embodiment of the system of the invention that can be used to practice the disclosed method.

For discussion purposes, the preferred method of the invention is simplified in FIG. 1 to the steps of reduction, separation, densification (including plastification, injection and agglomeration), recovery and lint removal. The system 10 used to perform the subject method is discussed in relation to FIGS. 1 and 2.

In the reduction step, baled polywaste containing polyethylene, paper and other tramp materials is broken open either manually or mechanically and fed to a shredder 12. The paper content at this stage is preferably not greater than about 20 weight percent, and is preferably about 15 weight percent or less. If the moisture content of the feedstock is significant, a rotary drier or other similarly effective means can be used to dry the material before or after shredding. Large contaminants that might damage the shredder are desirably removed upstream. Inside the shredder, which typically contains at least one rotating shaft, generally horizontal, having a plurality of cutter blades sweeping out vertically oriented, circular paths, the plastic and paper material is reduced in size to pieces preferably not having any dimension greater than about six inches. Although smaller fragments will invariably appear in the operation, most pieces exiting the shredder will desirably be at least about ½ inch in size in some direction. Shredders in other orientations, and having two or more rotating shafts, possibly with counter-rotating blades, can also be used within the scope of the invention.

Because shredding the mixed plastic and paper waste may free some paper from plastic with which it was previously bound, and also free previously entrapped tramp contaminants, physical separation of the smaller tramp materials and free paper downstream of the shredder is also desirable. Devices 14 useful as physical separation equipment for these purposes include, for example, magnetic separators, screen separators, gravitational separators, shaker tables, fans, vacuum separators, cyclonic separators, and the like.

After the tramp materials and free paper are removed and recovered or otherwise disposed of in an appropriate manner, the remaining shredded material, still containing both plastic and paper, is desirably discharged into a surge bin 16 suitably positioned for use in feeding the mixture to the densifier 18. The paper content of the shredded material at this point is likely to be significantly lower than in the original bales. While a preferred apparatus useful as the densifier of the invention is disclosed herein, it will be appreciated upon reading the disclosure that other mechanical configurations can likewise be used in practicing the method of the invention if they function similarly. A preferred densifier is a closed, cylindrical metal vessel approximately six feet tall and four feet in diameter, having mounted in its lower section (similar to a home blender) at least one motor-driven rotor blade having a length slightly less than the inside diameter of the vessel that sweeps a horizontal arc as it is rotated at approximately 1725 rpm by an electric motor rated between about 150 and 400 horsepower. A plurality, preferably from about 8 to 16, of adjustable bed knives up to about eight inches in length are desirably mounted on the rotor blade. A densifier of this size and configuration will typically accommodate batches of from about 250 to about 650 pounds of shredded paper and plastic for densification.

Once the mixed plastic and paper is charged to the densifier, the blade is activated and the cutting action continues for a period ranging from about five to about 20 minutes, depending upon the type, amount, paper content and moisture content of the material. As the blade and knives rotate, more paper is separated from the plastic and rises toward the top of the vessel due to its lighter weight and lower density. The plastic near the bottom is sheared by the rotating knives, causing its temperature to increase. As the surface temperature of the plastic reaches its softening point, generally at a temperature ranging between about 220 and about 400 degrees F., depending upon the plastic, the amperage required by the motor will increase and the rotating blade will typically begin to vibrate. By monitoring the surface temperature of the plastic inside the densifier with an infrared thermometer, and by monitoring the motor amperage and the vibration level within the densifier, one can determine the point at which fluid injection should occur. Further mixing beyond this point will cause the plastic to overheat and liquify in regions of highest shear, will increase vibration, and will lead to the production of undesirably large particles following injection.

Once the plastic has softened inside the densifier, a fluid 20 such as water at a temperature ranging from about 60 to about 70 degrees F. in an amount equal to about four gallons per 150 pounds of plastic is desirably injected into the vessel over a period ranging from about 10 to about 60 seconds. The water causes the comminuted plastic particles to agglomerate as the plastic is cooled, desirably producing particles (similar in appearance to large coffee grounds, or to large particles of freeze dried coffee) ranging in size from about 1/16 inch to about ½ inch, and preferably not more than about ¼ inch, in size. Once the surface temperature of the plastic inside the densifier has decreased to a range of from about 120 to about 165 degrees F., fluid injection is desirably discontinued. When densifying high density polyethylene, it may be desirable to use a jacketed vessel to avoid heat loss during fluid injection that is sufficient to lower the plastic temperature below this range. With low density polyethylene, vessel insulation alone is typically adequate for maintaining the desired temperature range inside the vessel during fluid injection. Although water is disclosed herein as the preferred injection fluid, other fluids such as steam and carbon dioxide can also be used within the scope of the invention, although process conditions will of course need to be tailored to their particular thermodynamic effects.

During injection, liberated paper particles inside the vessel tend to ball up and remain separated from the plastic as it cools and agglomerates, thereby facilitating subsequent removal. During densification, the density of the plastic material will likely increase from a range of about 2 to 3 pounds per cubic foot to a range of from about 16 to about 25 pounds per cubic foot. The densified plastic will have a paper content less than three weight percent, and typically, about one weight percent or less.

Following densification, the densified plastic and separated paper are discharged from the bottom of the densifier vessel and conveyed by an auger or other similarly effective means such as a blower or the like to a lint screen 22 or filter that can remove the already separated paper fiber from the densified plastic. An aspirator 24 or air wash device can also assist in the final removal of paper fiber from the densified plastic. At this stage of the process, other contaminants such as, for example, nylon tape, higher melting plastic particles such as polyethylene terephthalate (PET), styrene, particulate metals, etc. can also be removed by conventional physical separation techniques.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for recovering densified plastic from mixed waste containing plastic and less than about 15 weight percent paper, said waste having a density ranging from about 2 to about 3 pounds per cubic foot, said method comprising the steps of:

shredding the mixed waste at ambient conditions;

charging a batch of shredded waste weighing from about 250 to about 650 lbs. to a densifier;

further shredding the mixed waste inside the densifier with a motor-driven rotating blade while monitoring surface temperature of the plastic inside the densifier, amperage drawn by the motor-driver and vibration level within the densifier;

continuously shredding waste inside the densifier for a period ranging from about 5 to about 20 minutes, until the surface temperature of the plastic reaches at least about 220° F., until the amperage drawn by the motor increases, and until the vibration level inside the densifier increases;

thereafter injecting a cooling fluid into the densifier to lower the surface temperature of the plastic to range of from about 120° to about 165° F. and agglomerate the plastic into particles ranging in size from about $\frac{1}{16}$ to about $\frac{1}{2}$ inch and having a paper content lower than about three percent by weight; and thereafter recovering densified plastic having a density ranging from about 16 to about 25 pounds per cubic foot.

2. The method of claim 1 wherein the plastic comprises polyethylene.

3. The method of claim 2 wherein the mixed waste is selected from hydropulp polywaste and postconsumer grocery bags.

4. The method of claim 1 wherein fluid injection occurs when the plastic inside the densifier reaches a surface temperature ranging from about 220 to about 400 degrees F.

5. The method of claim 1 wherein the injected fluid is water and the amount of water injected into the densifier is about four gallons per 150 pounds of plastic.

6. The method of claim 1 wherein a gas is injected into the densifier.

7. The method of claim 1 wherein the desired particle size ranges from about $\frac{1}{16}$ inch to about $\frac{1}{4}$ inch.

8. The method of claim 1, further comprising the step of recovering separated paper from the densified plastic using a lint screen.

9. The method of claim 1, further comprising the step of recovering separated paper from the densified plastic using air washing.

10. The method of claim 1 wherein the densified plastic comprises less than about 1 weight percent paper.

* * * * *